United States Patent [19]

Rankin

[11] Patent Number: 5,010,848
[45] Date of Patent: Apr. 30, 1991

[54] FOLDING TRAVEL CAGE

[76] Inventor: William J. Rankin, 1250 Victoria, Abilene, Tex. 79603

[21] Appl. No.: 425,579

[22] Filed: Oct. 23, 1989

[51] Int. Cl.$^5$ .................... A01K 31/08; A01K 31/12
[52] U.S. Cl. ...................................... 119/26; 119/17; 119/19; D30/118
[58] Field of Search .................. 119/17, 19, 26, 24, 119/29; 190/103, 104, 107, 21; 217/14, 46, 16, 48; D30/109, 114, 115, 116, 119

[56] References Cited

U.S. PATENT DOCUMENTS

| | | | |
|---|---|---|---|
| D. 153,272 | 4/1949 | Forner | 119/26 X |
| 1,030,980 | 7/1912 | De Vore | 119/24 |
| 1,231,977 | 7/1917 | Winship | 217/16 |
| 2,778,333 | 1/1957 | Babros et al. | 119/17 |
| 3,048,147 | 8/1962 | McKean | 119/19 |
| 4,319,545 | 3/1982 | Sou | 119/17 |
| 4,445,459 | 5/1984 | Julie | 119/19 X |

FOREIGN PATENT DOCUMENTS

| | | | |
|---|---|---|---|
| 1260853 | 2/1968 | Fed. Rep. of Germany | 119/17 |
| 2752894 | 6/1979 | Fed. Rep. of Germany | 119/19 |
| 1208874 | 2/1960 | France | 119/17 |
| 0014741 | of 1890 | United Kingdom | 119/17 |
| 0435759 | 9/1935 | United Kingdom | 190/20 |
| 0975364 | 11/1964 | United Kingdom | 119/19 |
| 2140267 | 11/1984 | United Kingdom | 119/17 |

OTHER PUBLICATIONS

Jan. 1989, Bird Talk, cover and pp. 20-23 & 26.
Mar. 1989, Bird Talk, cover and pp. 67 and 99.

Primary Examiner—Robert P. Swiatek
Assistant Examiner—Todd E. Manahan
Attorney, Agent, or Firm—Knobbe, Martens, Olson & Bear

[57] ABSTRACT

The present invention is a folding travel cage for birds that can be stored in a self-contained case and assembled into a small travel cage or a large cage. The present invention comprises a tray, a lid, a base, two cage assemblies and a cage lid. When assembled as a case, the tray, the lid and base are attached together, and the two cage assemblies and the cage lid are stored inside. When the present invention is assembled as a small travel cage, the cage lid covers one cage assembly that is attached atop the base and tray. The other cage assembly can be stored in the lid. When configured as the large cage, the cage size is doubled by attaching the cage assemblies on top of each other between the base and cage lid. The present invention also includes a playpen that can be stored in or assembled upon the lid.

13 Claims, 5 Drawing Sheets

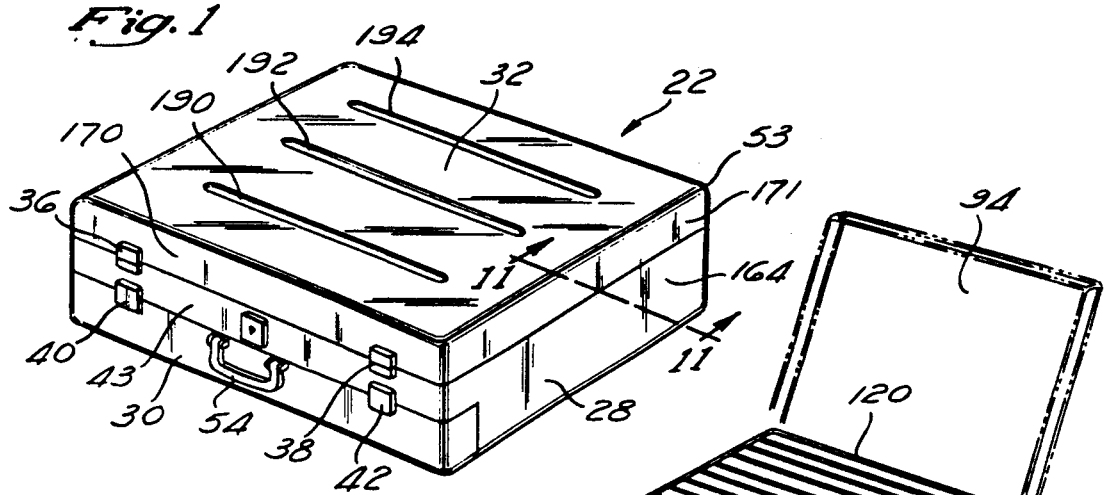
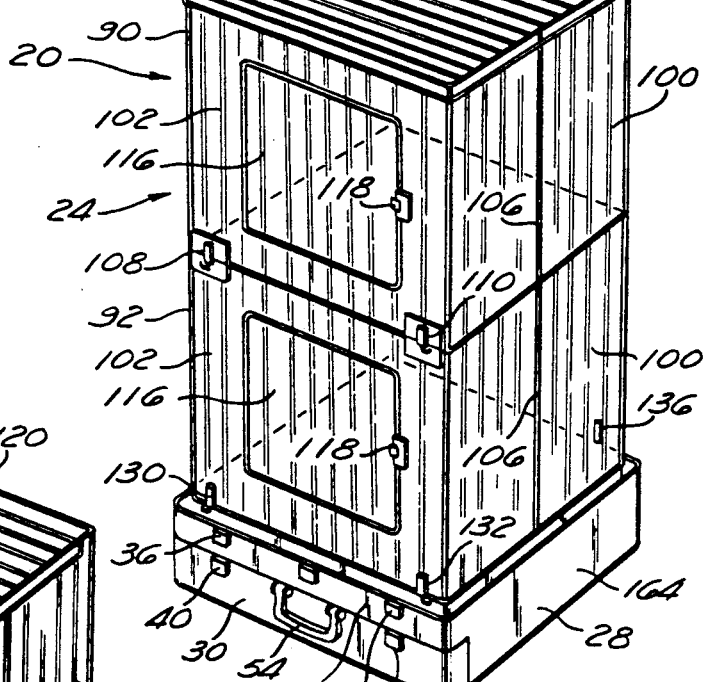
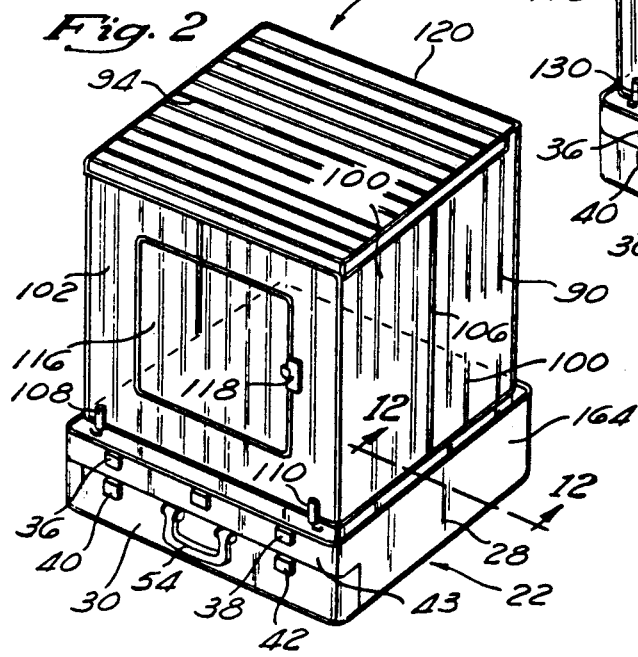

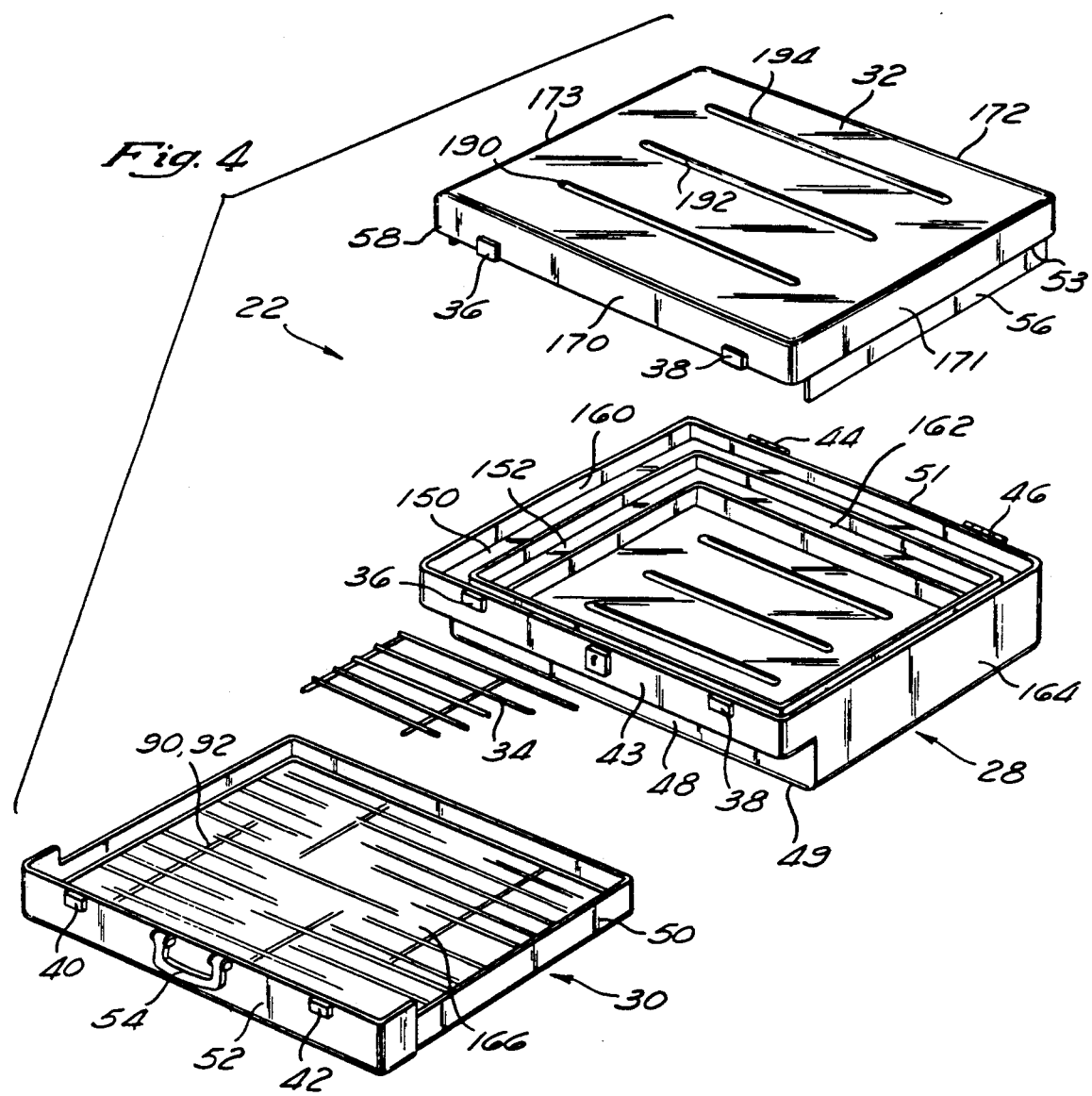

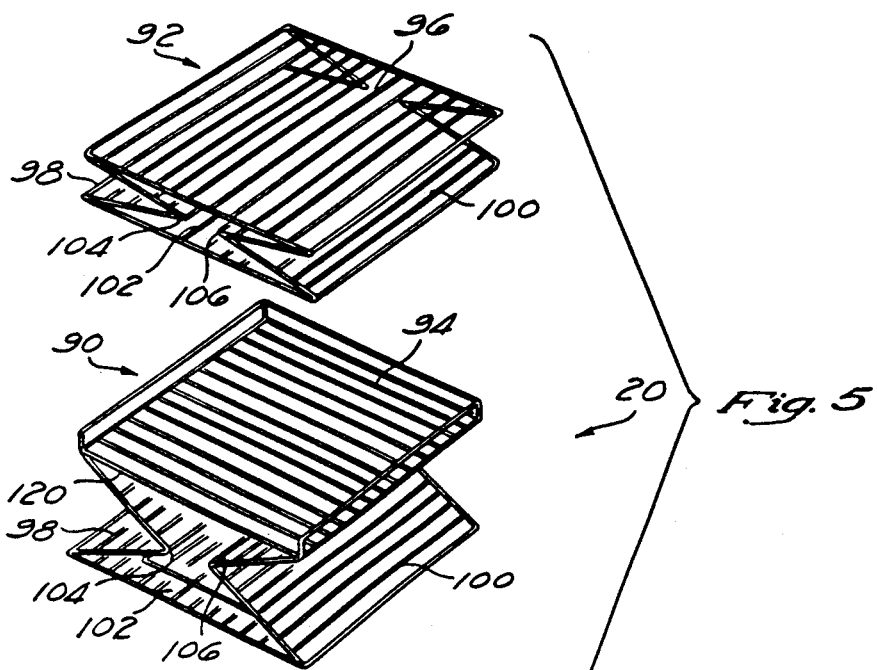
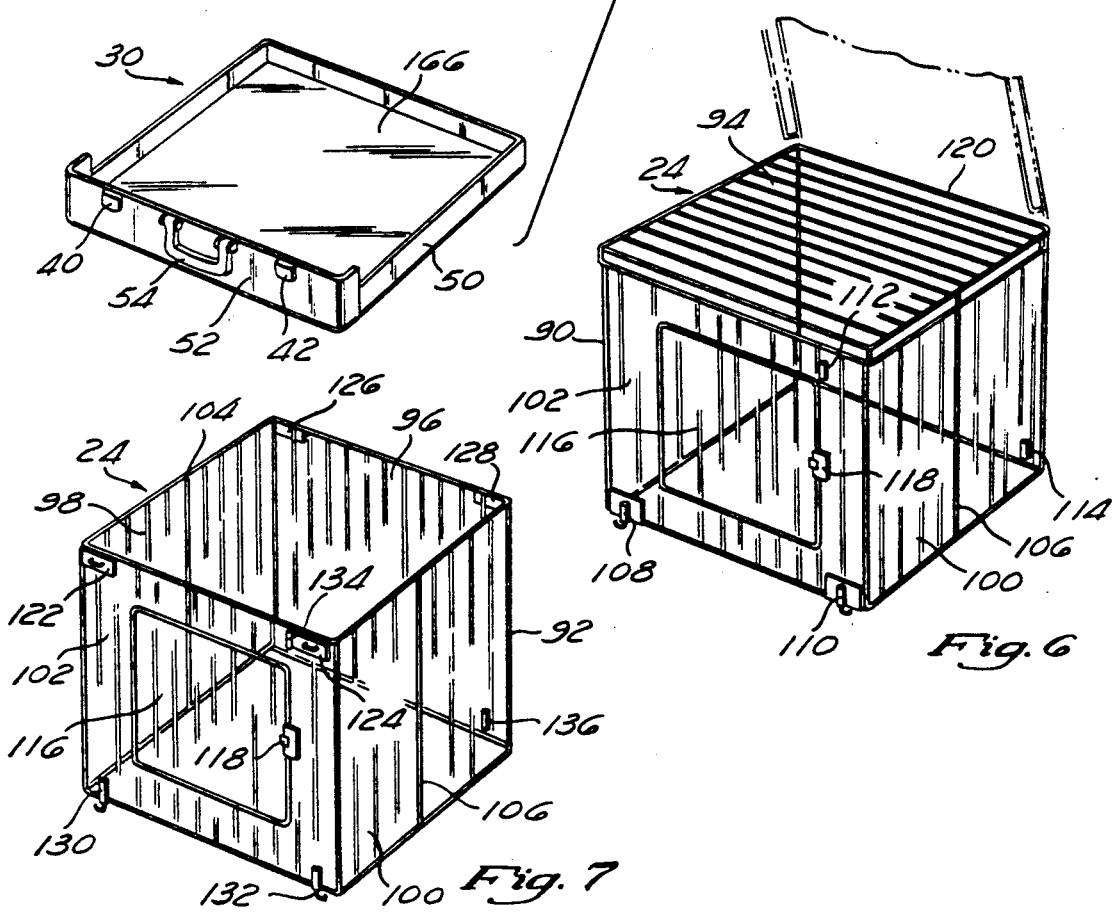

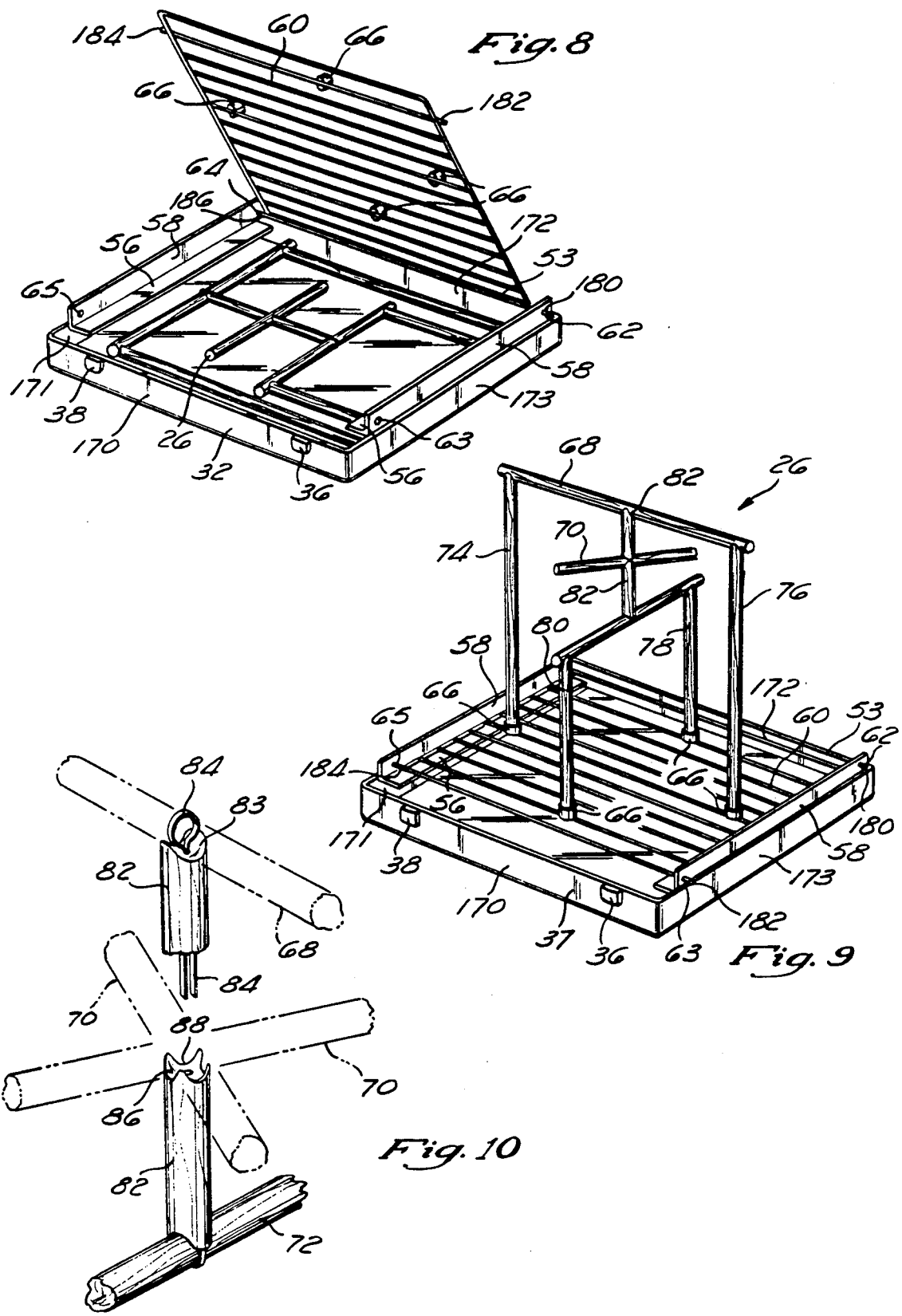

1

FOLDING TRAVEL CAGE

BACKGROUND OF THE INVENTION

The present invention relates to cages for animals. More particularly, this invention relates to a cage for transporting pet animals. Most particularly, the present invention relates to a portable and collapsible cage for birds.

It has become common practice for owners of pet birds to take them along when they travel. Small cages for transporting pets and other animals are well known. For example, the Cabin Kennel by Doskocil Manufacturing allows bird owners to carry their birds on an airplane, but is too small to house a bird once the destination is reached. Other examples of such cages are the Bird Motel by Papagallo Enterprises, the Combo-Polly and Porta-Polly by San Juan Aviaries and the No. 135 Small Parrot Cage by Prevue. However, these cages presently used for transporting birds do not provide a cage that is suitable for use both during transportation and once the destination has been reached. Most cages for transporting pet birds are too small to house a bird comfortably over an extended period of time. Larger cages that can comfortably house a bird for a long period of time are often too bulky and cumbersome for use when traveling in a car, train or airplane.

SUMMARY OF THE INVENTION

The present invention advantageously eliminates the problems of the prior art by providing a folding travel cage for birds that can take several configurations. The present invention can be configured as a self-contained case for the cage, a small travel cage or a larger cage to house the bird at a final destination. Moreover, the present invention can be easily assembled into any of these configurations.

In one aspect, the present invention forms a case for storing the bird cage. The case is advantageously compact and stores both sections of the cage when the cage is not being used. Additionally, the case has room to store a playpen, cups, a perch, accessories and other supplies.

In another aspect of the invention, the case and a cage section are assembled to form a small cage appropriate for use during travel. The travel cage is adequately compact for use in a small automobile while providing enough room for a large bird. The present invention also comprises a base to compensate for sloping car seats, and a means using the car seat belt to secure the cage in place for this aspect of the invention.

In still another aspect of the invention, a second section of cage can be added to transform the small travel case into a larger cage that can comfortably house a bird on a more permanent basis. The additional section may, for example, double the size of the cage.

In yet another aspect of the invention, the lid of the case is used to store a one-piece playpen. The one-piece playpen is easy to assemble and employs the lid as a base.

BRIEF DESCRIPTION OF THE DRAWINGS

FIG. 1 illustrates a perspective view of the folding travel cage of the present invention in the closed position storing the cage.

FIG. 2 illustrates a perspective view of the folding travel cage of the present invention configured at half-height as a travel cage.

FIG. 3 illustrates a perspective view of the folding travel cage of the present invention configured at full height.

FIG. 4 is an exploded view of the folding travel cage configured as a case storing the cage.

FIG. 5 illustrates an exploded view of the base and cage wall assemblies of the folding travel cage of the present invention.

FIG. 6 is a perspective view of the upper cage assembly and cage lid of the folding travel cage of the present invention.

FIG. 7 illustrates a perspective view of the lower cage assembly of the folding travel cage of the present invention.

FIG. 8 illustrates a perspective view of the lid of the case of the folding travel cage storing the playpen and playpen grate.

FIG. 9 illustrates a perspective view of the playpen assembled on the playpen grate and the lid of the case.

FIG. 10 illustrates a partial cross-sectional view of the three crossbars and the connector bar of the playpen of the present invention.

DESCRIPTION OF THE PREFERRED EMBODIMENT

Figure 11:
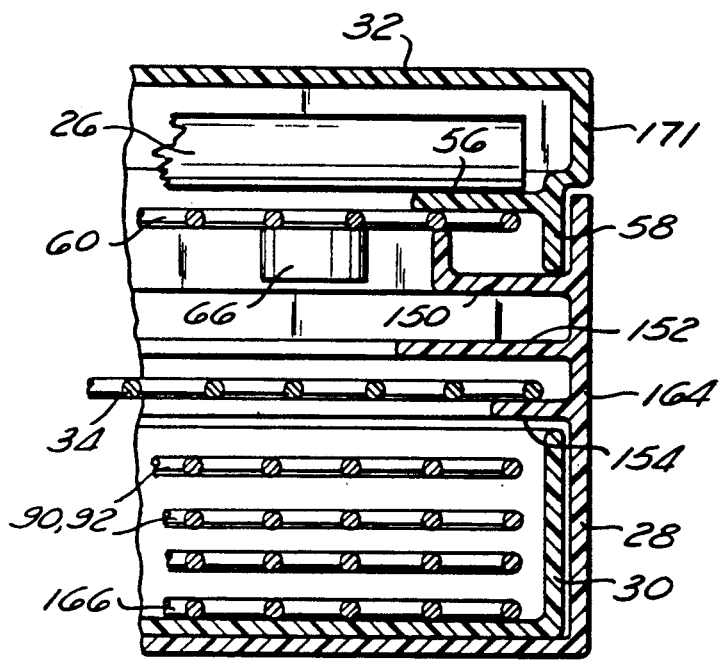
FIG. 11 is a partial cross-sectional view of the folding travel cage of the present invention as a case in the closed position storing the playpen and the grates.

The problems encountered in the prior art are eliminated by the present invention of a folding travel cage 20. The folding travel cage 20 of the present invention can be easily assembled in any of three configurations, as shown in FIGS. 1-3. In a preferred embodiment the present invention comprises a case 22, a cage 24 and a playpen 26. The case 22 and the cage 24 are used together in all three configurations of the present invention. When the folding travel cage 20 is not being used, the cage 24 and the playpen 26 are placed within the case 22 for storage as illustrated in FIG. 1. When the folding travel cage 20 functions as a cage, the case 22 is utilized as the bottom of the cage 20. The present invention can be used either as a small travel cage, as in FIG. 2, or a larger full height cage, as in FIG. 3. While it is intended that the present invention be used for birds, it should be understood by one skilled in the art that the present invention could be used for other animals as well.

As can be seen in FIGS. 1 and 4, the case 22 further comprises a base 28, a lower tray 30, a lid 32, a floor grate 34, four latches 36, 38, 40 and 42, and a pair of releasable hinges 44 and 46. The base 28, the lower tray 30 and the lid 32 advantageously fit together to form the case 22. The latches 36, 38, 40 and 42 and the releasable hinges 44 and 46 retain the folding travel cage 20 in the closed position of the case 22 as seen in FIG. 1.

In a preferred embodiment, shown in FIG. 4, the base 28 is a substantially rectangular box. In an exemplary embodiment, the base 28 has a length of 21 inches, a width of 19 inches, and a height of 6 inches. The base 28 has an opening 48 spanning the entire length of a front bottom edge 49. This opening 48 permits the lower tray 30 and the floor grate 34 to be inserted into base 28. On the top remote longitudinal edge 51 of the base 28, the removable hinges 44 and 46 are attached. The removable hinges 44 and 46 connect the remote top longitudinal 51 edge of the base 28 to the bottom longitudinal edge 53 of the lid 32. This permits the lid 32 to swing open, allowing the user access to the contents of the base 28. Additionally, each of the latches 36, 38, 40 and 42 is attached to the front 43 of the base 28. The latches 36, 38, 40 and 42 are located on the front 43 of the base 28 opposite from the removable hinges 44 and 46. The latches 36 and 38 attach the lid 32 to the base 28, and the latches 40 and 42 attach the base 28 to the lower tray 30 so that the lid 32, the base 28 and the lower tray 30 fit together as the case 22, as illustrated in FIG. 1. The latches 36, 38, 40 and 42, as well as the hinges 44 and 46, may take any of a number of forms other than those shown in the drawings, as will be understood by those of ordinary skill in the art.

Figure 12:
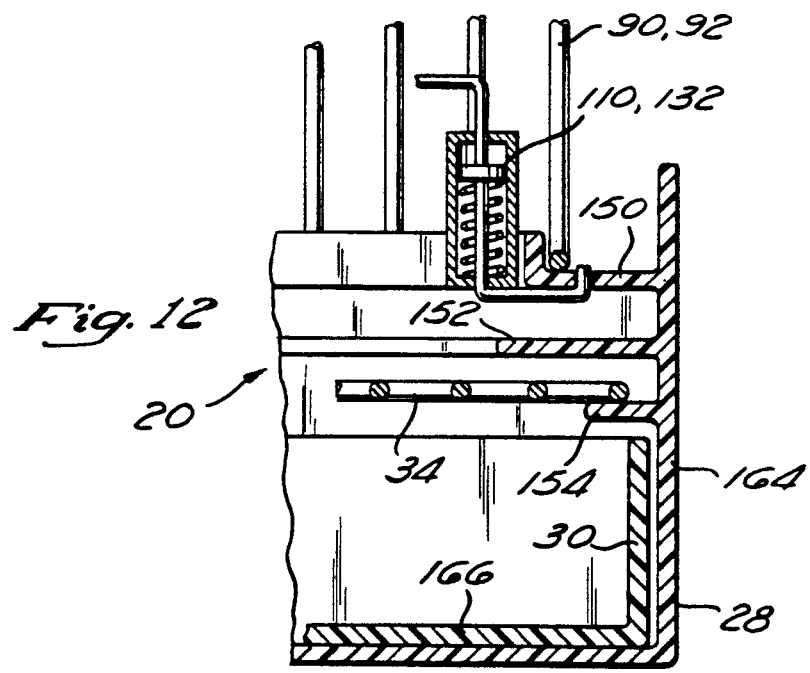
FIG. 12 illustrates a partial cross-sectional view of the base and the cage assembly of the folding travel cage of the present invention assembled as a cage.

The base 28 further comprises a bracket member 150, an upper member 152 and a support member 154 as illustrated in FIGS. 4, 11 and 12. These members 150, 152 and 154 are all cantilever-like members which project inward generally perpendicular to the walls 160, 162 and 164 of the base 28. The cantilever-like members 150, 152 and 154 may extend along the full length of the walls 160, 162 and 164 of the base 28. As illustrated in FIGS. 11 and 12, the bracket member 150 is L-shaped in cross section and extends inward, away from the base 28, and then upward, parallel to the walls 160, 162 and 164 of the base 28. The bracket member 150 advantageously engages the lid 32 when the present invention is used as the case 22, as shown in FIG. 11, and also supports the walls of the cage 24 when the present invention functions as the cage 24, as shown in FIG. 12. The bracket member 150 is located near the top of the walls 160, 162 and 164 of the base 28. The support member 154 is located at about half the height of the base 28 and the upper member 152 is located just above the support member 154. The upper member 152 and the support member 154 are planar with the upper member 152 extending inward about twice the distance of the support member 154. The support member 154 and the upper member 152 hold the floor grate 34 in place, as shown in FIGS. 11 and 12.

As mentioned above, the lower tray 30 and the floor grate 34 are designed to slide into the base 28 through the opening 48. The lower tray 30 is used to store the cage 24 when it is not in use. The lower tray 30 also functions as a repository for waste created by birds in the cage 24. The floor grate 34 operates as the bottom of the cage 24 when the base 28 is used in conjunction with the cage 24. The floor grate 34 separates the cage 22 from the lower tray 30, which acts to collect the waste. This configuration advantageously prevents the birds from walking in the waste, and allows for easy cleaning of the cage 24. As shown in FIG. 4, the floor grate 34 can be easily removed for cleaning, as can the lower tray 30.

In a preferred embodiment shown in FIG. 4, the lower tray 30 has a generally planar rectangular bottom 166 and a substantially uniform, upstanding rim 50 along the rear edge and most of the side edges of the bottom 166. The remaining perimeter of the lower tray 30 has an outwardly protruding rim 52 identical in shape to the opening 48 cut out from the base 28. The identity of shape between the outward rim 52 and the opening 48 allows the lower tray 30 to act as a drawer, the face of which is flush with the base 28. Accordingly, the outward rim 52 combines with the base 28 to give the base 28 a substantially box-like shape, as illustrated in FIG. 1. The lower tray 30 is retained securely within the base 28 by the latches 40 and 42. In addition, the lower tray 30 advantageously has a handle 54 attached near the center of the outward rim 52. The handle 54 can be used to carry the case 22 when the latches 36, 38, 40 and 42 are secured to hold the base 28, the lower tray 30 and the lid 32 together. Moreover, the handle 54 aids in removing and inserting the lower tray 30 with respect to the base 28. For example, the lower tray 30 can easily be moved from the position within the base 28 as illustrated in FIGS. 1-3 to the position fully outside the base 28 as illustrated in FIG. 4 by pulling the handle 54 while holding the base 28.

The lid 32 is a substantially planar rectangular cover with walls 170, 171, 172, and 173 of uniform height protruding downward. In an exemplary embodiment the lid 32 has a length of 21 inches, a width of 19 inches, and a height of 3 inches. On the remote longitudinal edge 53, the removable hinges 38 and 40 connect the lid 32 to the base 28. As shown in FIG. 11, each side wall 171 and 173 of the lid 32 has an inwardly offset and downwardly protruding extension 58, and an inwardly protruding cantilever-like extension 56 extending from the extension 58. These extensions 56 and 58 are designed to interlock with the bracket member 150 when the lid 32 closes upon the base 28, as shown in FIG. 11. The extensions 56 and 58 extend the side walls 171 and 173 of the lid 32 vertically downward toward the base 28, and also perpendicular to the walls 171 and 173 toward the inside of the lid 32.

The base 28, lower tray and lid 32 may be conveniently formed of molded plastic. Other durable materials, such as aluminum, may be used, as will be understood by one of ordinary skill in the art.

Referring now to FIGS. 8-10, the playpen 26 of the present invention is detailed. FIG. 8 illustrates the playpen 26 stored in the lid 32. A playpen grate 60 is also attached to the lid 32 through holes 62, 63, 64 and 65 in the extension 58. Near each corner of the playpen grate 60, there is a retainer bar 180, 182, 184 and 186 that extends outwardly toward the side walls 171 and 173 of the lid 32. For example, the retainer bars 180 and 182 extend toward the side wall 171, and the retainer bars 184 and 186 extend toward the opposite side wall 173. The bars 180, 182, 184 and 186 interact with the side walls 171 and 173 to form a releasable retaining mechanism. The playpen grate 60 is held in place, since the bars 180, 182, 184 and 186 fit into the holes 62, 63, 64 and 65, respectively. This arrangement advantageously allows the playpen grate 60 to swing open for removal of the playpen 26 as shown in FIG. 8. When the playpen 26 is stored or assembled, the playpen grate 60 rests upon the extensions 56 and 58 of the lid 32, and interaction between the bars 180, 182, 184 and 186 and the holes 62, 63, 64 and 65 holds the playpen grate 60 in place.

Four retaining cups 66 are attached on the playpen grate 60 to hold the playpen 26 when it is assembled on the lid 32 as in FIG. 9. These retaining cups 66 may advantageously take the form of a planar metal disc having a cylindrical wall, the disc being attached to the grate by suitable means, such as welding.

As shown in FIGS. 9 and 10, the playpen 26 is further comprised of crossbars 68, 70 and 72, support legs 74, 76, 78 and 80, a connecting bar 82 and an elastic 84. These parts advantageously form a one-piece playpen 26 that is easy to assemble. In an exemplary embodiment shown in FIG. 9, the crossbars 68, 70 and 72, support legs 74, 76, 78 and 80, and connecting bar 82 are made of wooden dowels. The support legs 74 and 76 are attached to each end of the higher crossbar 68 to form a coplanar "U" shape. As permanently affixed, the support legs 74 and 76 are parallel to each other, and perpendicular to the crossbar 68. The lower crossbar 72 and its associated support legs 78 and 80 are connected in a similar manner to form a coplanar "U" shape. The support legs 78 and 80 are shorter than the support legs 74 and 76, and thus, position each crossbar 68 and 72 at a different height. The lower crossbar 70 is also shorter in length than the higher crossbar 68. This allows both U-shapes to be coplanar when stored in the lid 32 as illustrated in FIG. 8 since the lower crossbar 72 and its supporting legs 78 and 80 are shorter than the higher cross bars 68 and its support legs 74 and 76. The higher and lower crossbars 68 and 72 are joined at a midpoint along their length by the connector bar 82 and the elastic 84. As illustrated in FIG. 10, the elastic 84 is connected between cross bars 68 and 72 through a bore down the center longitudinal axis of the connector bar 82 and a hole through the middle crossbar 70 at a midpoint along the length of the crossbar 70. The middle level crossbar 70 bisects the connector bar 82 into two sections. This configuration advantageously allows the playpen 26 to assume a substantially coplanar shape for storage and a three-dimensional shape when assembled. Although the elastic 84 is shown looped around the cross bar 68, this arrangement offers exposed elastic, which a bird will quickly chew through. Alternative arrangements, such as connecting the elastic 84 to the cross bars 68 and 72 by means of a small screw eye, that allow for hiding the elastic, will be readily apparent to one of ordinary skill.

The assembled playpen 26 is illustrated in FIG. 9. As can be seen, the plane formed by the higher crossbar 68 and its support legs 74 and 76 is normal to the plane formed by the lower crossbar 72 and its support legs 78 and 80. In FIG. 8, the plane formed by the higher crossbar 68 and its support legs 74 and 76 is the same as the plane formed by the lower crossbar 72 and its support legs 78 and 80 because the elastic 84 allows lower crossbar 72 to be rotated 90 degrees about the axis of the connecting bar 82.

The ends of the connecting bar 82 adjacent the higher and lower crossbars 68, 72 are provided with a groove 83 having a radius substantially the same as that of the crossbars 68, 72 so as to facilitate orientation of said connecting bar 82 with said crossbars 68, 72. Each section of the connecting bar 82 adjacent the middle crossbar 70 has a grooved end formed into a pair of detents 86, 88. These grooved detents 86, 88, in cooperation with the elastic 84 and the cylindrical surface of the crossbar 70, urge the crossbar 70 into either of two metastable positions, one coplanar with the folded playpen 26, as shown in FIG. 8, and one disposed at a 45 degree angle to the higher and lower crossbars 68 and 72, as shown in FIG. 9. The 45 degree angle is obtained by orienting the grooved detent 86 at a 45 degree angle from the grooves 83 in the connecting bar 82.

Assembly of the playpen 26 is accomplished by first removing the playpen 26 from the lid 32. By lifting one end of the playpen grate 60, the grate 60 swings open, as illustrated in FIG. 8, so that the playpen 26 may be removed. Next, the lower crossbar 72 and its support legs 78 and 80 are put in position by placing the support legs 78 and 80 in the retaining cups 66 on the playpen grate 60, as illustrated in FIG. 9. Once the lower crossbar 72 has been positioned, the higher crossbar 68 and its support legs 74 and 76 are positioned by placing the support legs 74 and 76 in the remaining retaining cups 66 in a similar fashion. In order to place the higher crossbar 68 in the retaining cups, the two sections of the connector bar 82 must lock with the middle crossbar 70 and hold the connector bar 82 in a position that is nonplanar with both the higher crossbar 68 and its support legs 74 and 76, or the lower crossbar 72 and its support legs 78 and 80.

The elastic 84 allows the middle crossbar 70 and the lower crossbar 72 to be placed in almost any position with respect to the higher crossbar 68. This aforementioned scheme advantageously allows the two sections of the connector bar 82 to be pulled apart so that the middle crossbar 70 and the lower crossbar 72 may be freely positioned. The elastic 84 allows the higher crossbar 68 and a section of the connector bar 82 to be pulled apart from the lower crossbar 72 and a section of the connector bar 82. The elastic 84 holds the higher crossbar 68, the connector bar 82, the middle crossbar 70 and the lower crossbar together, but not interlocking. When pulled apart, the crossbars 68, 70 and 72 of the playpen 26 can be placed in the same plane, yet held together by the elastic 84, as illustrated in FIG. 8. This allows the playpen 26 to be stored in the lid 32 of the case 22. In contrast, when assembled as a rigid structure, the two sections of the connector bar 82 apply pressure upon the middle crossbar 70 against the detents 86, 88 to lock it in place.

Referring now to FIGS. 2, 3 and 5-7, the cage 24 will be described in detail. The cage 24 comprises a first cage wall assembly 90, a second cage wall assembly 92 and a cage lid 94. The base 28 advantageously functions as a foundation for both the case 22 and the cage 24. In an exemplary embodiment, the half-height cage 24 illustrated in FIG. 2 has a length of 21 inches, a width of 19 inches and a height of 21½ inches, and the full-height cage 24 illustrated in FIG. 3 has a length of 21 inches, a width of 19 inches and a height of 38 inches.

In a preferred embodiment the cage wall assemblies 90, 92 are nearly identical and comprise wall sections of grate connected to form four interconnected walls 96, 98, 100 and 102. In a exemplary embodiment, the cage wall assemblies 90 and 92 and the cage lid 94 are constructed from similar grate material, and use bars 3/16 of an inch in diameter and spaced 1¼ inches apart. One of ordinary skill in the art will recognize that the size and spacing of the bars that make up the grate material of the cage wall assemblies 90 and 92 and cage lid 94 may be varied depending on the type of bird intended to be stored. Further, one of ordinary skill in the art will appreciate that the cage wall assemblies 90 and 92 and cage lid 94 may be made of material other than metal wire grate. For example, acrylic materials have been used in bird cages with some success. However, such materials should be used with caution to prevent overheating of the cage occupant.

Referring to FIGS. 5 and 7, the rear wall 96 is a simple solid grate. The side walls 98 and 100 are of equal dimensions and are vertically divided in half by a hinge 104 and 106 respectively. The hinges 104 and 106 allow the side walls 98 and 100 to fold in half inward to collapse the cage 24, as shown in FIG. 5. When in the collapsed position, the cage 24 flattens with the side walls 98 and 100 folded in half between the front 102 and rear 96 walls as illustrated in FIG. 5. As just described, the cage wall assemblies 90 and 92 collapse and can be stored in the lower tray 30 of the case 28 as illustrated in FIGS. 4 and 5. The front walls 102 of the cage wall assemblies 90 and 92 are a solid grate with a large door 116, as shown in FIGS. 6 and 7. The large door 116 provides easy access to the cage 24. The large door 116 is advantageously kept closed with a bird-proof latch 118 of known construction.

The second cage wall assembly 92 is the same as the first cage wall assembly 90, except that the second cage wall assembly 92 does not have a cage lid 94 and at each upper corner of the second cage wall assembly there is a fastener receiving means 122, 124, 126 and 128.

The cage lid 94 is connected to the first cage wall assembly 90 by a hinge 120. The hinge 120 connects the rear wall 96 with the cage lid 94. Because the cage lid 94 and the rear wall 96 are attached together in this manner, the cage lid 94 can advantageously be folded together with the first cage wall assembly 90 for storage as shown in FIG. 5. The cage lid 94 seals off the enclosure provided by the base 28 and first cage wall assembly 90. The cage lid 94 may be provided with a suitable bird-proof latch (not shown).

As shown in FIGS. 2 and 3, the present invention can advantageously be configured in two different sized cages. When configured as the small travel cage 24 as shown in FIG. 2, the cage 24 consists of the base 28, the first cage wall assembly 90, and the cage lid 94. The base 28 serves as the bottom of the cage 24. Also, the floor grate 34 housed in the base 28 prevents the birds contained in the cage 24 from getting into the lower tray 30. As shown in FIG. 12, the first cage wall assembly 90 is placed upon the bracket member 150 of the base 28. The bracket member 150 protrudes from the base 28 of the case 22 and fits partially inside the walls 96, 98, 100 and 102 of the first cage wall assembly 90. The bracket member 150 forces the walls 96, 98, 100 and 102 outward to prevent the first cage wall assembly 90 from collapsing inward. The first cage wall assembly 90 also comprises spring loaded barrel fasteners 108, 110, 112 and 114 near each corner. The spring loaded barrel fasteners 108 and 110 are located on the bottom of the front wall 102 and the spring loaded barrel fasteners 112 and 114 are located on the bottom of the rear wall 96. These spring loaded barrel fasteners 108, 110, 112 and 114 lock the first cage wall 90 in place by engaging with holes in the bracket member 150 of the base 28. One of ordinary skill in the art will recognize that other forms of fasteners may be used in place of those shown. Once the first cage wall assembly 90 is situated on the base 28, the cage lid 94 may be folded so as to seal off the enclosure created by the cage wall assembly 90 and base 28. The second cage wall assembly 92 and the playpen 26 may be conveniently stored in the lid 32 of the case 34.

Figure 13:
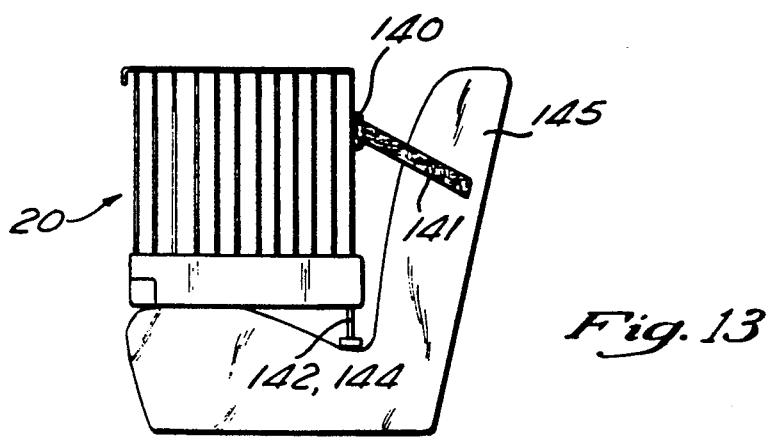
FIG. 13 illustrates a side view of the folding travel cage of the present invention assembled as a small travel cage and positioned upon the seat of an automobile.

When configured as the small travel cage 24 just described, a preferred embodiment of the present invention also comprises a hook 140 and adjustable feet 142 and 144 as illustrated in FIG. 13. These additional features enhance the utility of the present invention for use in transporting birds. The hook 140 is provided to secure the cage 24 in a stationary position within a vehicle. The hook 140 is adapted to receive the seat belt 141 of a vehicle to secure the cage 24 in a fixed position. The adjustable feet 142 and 144 compensate for the slant of a vehicle seat 145 to keep the cage 24 level. As illustrated in FIG. 13, the adjustable feet 142 and 144 fold out of the base 28 to a vertical position.

In comparison, when configured as a larger cage 24 shown in FIG. 3, the cage 24 consists of the base 28 of the case 22, the first cage wall assembly 90, the second cage wall assembly 92, and the cage lid 94. The larger cage 24 is configured in a manner similar to the smaller cage 24 beginning with the base 28. However, instead of placing the first cage wall 90 on the base 28, the second cage wall 92 rests on the base 28. The second cage wall assembly 92 includes spring loaded barrel fasteners 130, assembly 92 includes spring loaded barrel fasteners 130, 132, 134 and 136 at each bottom corner to engage the bracket member 150 of the base 28. The first cage wall assembly 90 and the cage lid 94 are attached as described above for the small cage 24 and they are placed upon the second cage wall assembly 92 which now connects to the base 28. The first cage wall assembly 90 and second cage wall assembly 92 are held together because the spring loaded barrel fasteners 108, 110, 112 and 114 of the first cage wall 90 mate with the fastener receiving means 122, 124, 126 and 128 of the second cage wall assembly 92. Of course, one of ordinary skill in the art will appreciate that other types of fasteners may be used in place of those shown.

Finally, the assembled playpen 26 and lid 32, as illustrated in FIG. 9, may be placed in an interlocking position on top of the cage 24 as assembled in FIGS. 2 or 3. As can be seen in FIG. 1, the lid 32 of the case 22 has several raised mounting ridges 190, 192 and 194 that engage the bars that comprise the cage lid 94. These mounting ridges 190, 192 and 194 mate with the cage lid 94 to retain the assembled lid 36 of the case 22 on the cage lid 94. The mounting ridges 190, 192 and 194 act as releasable retaining means, and thus, provide for easy mounting and detachment of the cage lid 94 from the case lid 32.

Having described the invention in connection with certain preferred embodiments thereof, it will be understood that many modifications and variations thereto are possible, all of which fall within the true spirit and scope of this invention.

What is claimed is:

1. An adjustable, portable travel animal cage which may be conveniently stored in a self-contained suitcase and quickly and easily be assembled into a small cage or a large cage, comprising:
   a suitcase base;
   a suitcase lid having means for securing said lid to said suitcase base to form a closed suitcase;
   a first grate storable in said suitcase and removably attached to said suitcase base for providing a cage floor;
   a first cage wall assembly having a top and bottom, corners and four rectangular sides hingeably interconnected at the corners for placement upon said suitcase base to form an animal cage of a height suitable for automobile travel, said first cage wall assembly being collapsible and storable in said suitcase and having means for releasably securing said first cage wall assembly on top of said suitcase base;
   a cage lid storable in said suitcase for securing to the top of said first cage wall assembly and enclosing said cage to prevent escape of birds therefrom; and a second wall assembly having a top and bottom, corners and four rectangular sides hingeably interconnected at the corners for placement between said suitcase base and said first cage wall assembly to form an animal cage of a height suitable for a long-term storage of an animal, said second cage wall assembly being collapsible and storable in said suitcase and having means for securing said second cage wall assembly between said suitcase base and said first cage wall assembly.

2. An adjustable, portable travel animal cage which may be conveniently stored in a self-contained suitcase and quickly and easily be assembled into a small cage or a large cage, comprising:

a suitcase base;

a suitcase lid having means for securing said lid to said suitcase base to form a closed suitcase;

a first grate storable in said suitcase and removably attach to said suitcase base for providing a cage floor;

a first cage wall assembly having a top and bottom, corners and four rectangular sides hingeably interconnected at the corners for placement upon said suitcase base to form an animal cage of a height suitable for automobile travel, said first cage wall assembly being collapsible and storable in said suitcase and having means for releasably securing said first cage wall assembly on top of said suitcase base;

a cage lid storable in said suitcase for securing to the top of said first cage wall assembly and enclosing said cage to prevent escape of birds therefrom;

a second grate storable in said suitcase and removably attached to said suitcase lid; and a playpen storable in said suitcase and comprised of a plurality of cross bars positioned as perches at different heights, and play pen adapted for placement on said second grate when assembled.

3. An adjustable, portable travel bird cage which may be quickly and easily disassembled and folded within a suitcase suitably sized to be carried onto an airplane, which may be quickly and easily assembled to a first height suitable for travel in an automobile or which may be quickly and easily assembled to a second height suitable for housing a bird for an extended period of time, comprising:

a suitcase base having a generally planar bottom surface, generally planar side walls extending upwardly from said bottom surface, a handle for carrying said cage when folded within said suitcase, cage wall base structure, floor grate support structure and a drawer for receiving bird waste, said drawer being slidable with respect to said suitcase base to allow easy cleaning of said drawer, said base having adjustable legs for leveling said base so as to support the assembled bird cage;

a first grate removably attached to said suitcase base at said grate support structure for allowing collection of bird waste within the suitcase base and preventing a bird from walking in said waste;

a suitcase lid having a generally planar top surface and means for securing said lid to said suitcase base to form a closed suitcase which may be carried onto an airplane;

a foldable first cage wall assembly adapted to be either folded substantially flat or assembled into a rectangular cage wall assembly having a top, corners and four rectangular sides hingeably interconnected at the corners for placement on said cage wall base structure to form a bird cage of a height suitable to allow placement of said bird cage in an automobile seat, thereby providing a bird cage suitable for automobile travel;

a cage lid secured to the top of said first cage wall assembly for enclosing said cage to prevent escape of birds therefrom;

a foldable second cage wall assembly adapted to be either folded substantially flat or assembled into a rectangular cage wall assembly having corners and four rectangular sides hingeably interconnected at the corners for interposition between said first cage wall assembly and said cage wall base structure, thereby providing a bird cage of a height suitable for housing birds for an extended period of time;

a second grate for placing on the suitcase lid after said suitcase lid has been inverted to provide a play surface for a bird and allow collection of bird waste in the suitcase lid and prevent a bird from walking in said waste;

a playpen for placing on said second grate to provide a perch for a bird, said playpen being foldable and adapted to fit within the suitcase lid for storage; and wherein said closed suitcase is adapted to carry said first and second grates, said first and second cage wall assemblies, said cage lid, said playpen and provisions for a bird.

4. The bird cage, as defined in claim 3, wherein said suitcase lid and base are made of molded plastic.

5. The bird cage, as defined in claim 3, wherein said first cage wall assembly has a door provided in one side thereof.

6. The bird cage, as defined in claim 3, wherein said first cage wall assembly has provided on a wall thereof means for attaching to an automobile seat belt so as to allow the bird cage to be secured into the seat of an automobile.

7. The bird cage, as defined in claim 3, wherein said suitcase base and suitcase lid have means for securing the bottom surface of the suitcase base on the top surface of the suitcase lid when the suitcase lid is being used as a base for the bird cage.

8. The bird cage, as defined in claim 3, wherein said suitcase lid has a bottom surface and means for securing the bottom surface to the cage lid when the suitcase lid is being used as a base for said playpen and said playpen is placed on top of said bird cage.

9. The bird cage, as defined in claim 3, wherein said second grate has means thereon for securing said playpen when said playpen is placed said second grate.

10. The bird cage, as defined in claim 3, wherein said playpen comprises:

a rigid U-shaped outer frame having a horizontal upper perch and depending legs;

a rigid U-shaped inner frame which is shorter and narrower than said outer frame, said inner frame having a horizontal lower perch and depending legs;

a first support column rigidly attached to and extending downwardly from said upper perch;

a second support column rigidly attached to and extending upwardly from said lower perch;

a horizontal intermediate perch rotatably disposed between said first and second support columns; and an elastic member connecting said first and second support columns and urging same against said intermediate perch.

11. The bird cage, as defined in claim 10, wherein said first support column has grooved top and bottom surfaces, the groove in said bottom surface being angularly offset by approximately 45° from the groove in said top surface, said second support column has grooved top and bottom surfaces, the groove in said top surface being angularly offset by approximately 45° from the groove in said bottom surface and said horizontal intermediate perch has a radius substantially equal to that of the bottom groove of said first support column and the top groove of said second support column.

12. A playpen for birds, comprising:
a rigid U-shaped outer frame having a horizontal upper perch and depending legs;
a rigid U-shaped inner frame which is shorter and narrower than said outer frame, said inner frame having a horizontal lower perch and depending legs;
a first support column rigidly attached to and extending downwardly from said upper perch;
a second support column rigidly attached to and extending upwardly from said lower perch;
a horizontal intermediate perch rotatably disposed between said first and second support columns; and
an elastic member connecting said first and second support columns and urging same against said intermediate perch.

13. The playpen, as defined in claim 12, wherein said first support column has grooved top and bottom surfaces, the groove in said bottom surface being angularly offset by approximately 45° from the groove in said top surface, said second support column has grooved top and bottom bracket surfaces, the groove in said top surface being angularly offset by approximately 45° from the groove in said bottom surface, and said horizontal intermediate perch has a radius substantially equal to that of the bottom groove of said first support column and the top groove of said second support column.

* * * * *